United States Patent
Yang et al.

(10) Patent No.: US 8,594,718 B2
(45) Date of Patent: Nov. 26, 2013

(54) UPLINK POWER HEADROOM CALCULATION AND REPORTING FOR OFDMA CARRIER AGGREGATION COMMUNICATION SYSTEM

(75) Inventors: Rongzhen Yang, Shanghai (CN); Xiangying Yang, Portland, OR (US); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 465 days.

(21) Appl. No.: 12/889,318

(22) Filed: Sep. 23, 2010

(65) Prior Publication Data

US 2011/0312366 A1    Dec. 22, 2011

Related U.S. Application Data

(60) Provisional application No. 61/356,538, filed on Jun. 18, 2010.

(51) Int. Cl.
*H04B 7/00* (2006.01)
(52) U.S. Cl.
USPC ............. 455/522; 455/67.11; 455/115.1; 455/115.3
(58) Field of Classification Search
USPC .................. 455/67.11, 115.1, 115.3, 522
See application file for complete search history.

(56) References Cited

U.S. PATENT DOCUMENTS

| | | | |
|---|---|---|---|
| 6,725,246 B2 | 4/2004 | Yang | |
| 7,039,106 B2 | 5/2006 | Yang | |
| 7,190,788 B2 | 3/2007 | Yang et al. | |
| 7,447,263 B2 | 11/2008 | Yang | |
| 7,593,851 B2 | 9/2009 | Yang | |
| 7,650,372 B2 | 1/2010 | Yang | |
| 7,782,817 B2 | 8/2010 | Yang et al. | |
| 7,796,498 B2 | 9/2010 | Yin et al. | |
| 7,804,799 B2 | 9/2010 | Venkatachalam et al. | |
| 7,885,210 B2 | 2/2011 | Yang et al. | |
| 7,885,214 B2 | 2/2011 | Ahmadi et al. | |
| 2005/0091049 A1 | 4/2005 | Yang et al. | |
| 2006/0095675 A1 | 5/2006 | Yang et al. | |
| 2007/0230405 A1 | 10/2007 | Yin et al. | |
| 2008/0019301 A1 | 1/2008 | Yin | |
| 2008/0019312 A1 | 1/2008 | Venkatachalam et al. | |
| 2008/0101285 A1 | 5/2008 | Venkatachalam et al. | |
| 2008/0117867 A1 | 5/2008 | Yin et al. | |
| 2008/0118061 A1 | 5/2008 | Yang et al. | |
| 2008/0151789 A1 | 6/2008 | Venkatachalam et al. | |
| 2008/0153506 A1 | 6/2008 | Yin et al. | |
| 2008/0159417 A1 | 7/2008 | Yin et al. | |

(Continued)

OTHER PUBLICATIONS

Xu, et al., "Method and apparatus for transmitting an ack/nack signal in a wireless communication system", U.S. Appl. No. 12/554,355, filed Sep. 4, 2009, pp. 1-34.

(Continued)

*Primary Examiner* — Yuwen Pan
*Assistant Examiner* — Fatuma Sherif
(74) *Attorney, Agent, or Firm* — Carrie A. Boone, P.C.

(57) ABSTRACT

A carrier aggregation power headroom reporting method is disclosed. User equipment selects from one of four possible definitions of a single parameter used to calculate the power headroom of the user equipment. The user equipment uses the parameter to calculate the power headroom for two different equations. The two results are transmitted to the enhanced base station.

5 Claims, 4 Drawing Sheets

(56) References Cited

U.S. PATENT DOCUMENTS

| | | | |
|---|---|---|---|
| 2008/0198830 A1 | 8/2008 | Mohanty et al. | |
| 2008/0232401 A1 | 9/2008 | Ahmadi et al. | |
| 2008/0261623 A1 | 10/2008 | Etemad et al. | |
| 2008/0282055 A1 | 11/2008 | Yang | |
| 2008/0311919 A1* | 12/2008 | Whinnett et al. | 455/447 |
| 2009/0003303 A1 | 1/2009 | Zhu et al. | |
| 2009/0040970 A1 | 2/2009 | Ahmadi et al. | |
| 2009/0080544 A1 | 3/2009 | Yin | |
| 2009/0088177 A1 | 4/2009 | Yang et al. | |
| 2009/0089768 A1 | 4/2009 | Chen et al. | |
| 2009/0097426 A1 | 4/2009 | Yin | |
| 2009/0109931 A1 | 4/2009 | Yin | |
| 2009/0111475 A1 | 4/2009 | Yang et al. | |
| 2009/0178032 A1 | 7/2009 | Yang et al. | |
| 2009/0247086 A1 | 10/2009 | Lin et al. | |
| 2009/0247148 A1 | 10/2009 | Chen et al. | |
| 2009/0274103 A1 | 11/2009 | Yang et al. | |
| 2009/0274105 A1 | 11/2009 | Choi et al. | |
| 2009/0323602 A1 | 12/2009 | Li et al. | |
| 2009/0323770 A1 | 12/2009 | Venkatachalam et al. | |
| 2010/0004016 A1 | 1/2010 | Yin et al. | |
| 2010/0005354 A1 | 1/2010 | Zhu et al. | |
| 2010/0005355 A1 | 1/2010 | Niu et al. | |
| 2010/0008325 A1 | 1/2010 | Hartman et al. | |
| 2010/0008331 A1 | 1/2010 | Li et al. | |
| 2010/0080113 A1 | 4/2010 | Yang et al. | |
| 2010/0080308 A1 | 4/2010 | Yin et al. | |
| 2010/0098037 A1 | 4/2010 | Li et al. | |
| 2010/0111047 A1 | 5/2010 | Yang et al. | |
| 2010/0144356 A1 | 6/2010 | Li et al. | |
| 2010/0157875 A1 | 6/2010 | Li et al. | |
| 2010/0157906 A1 | 6/2010 | Yang et al. | |
| 2010/0158147 A1* | 6/2010 | Zhang et al. | 375/260 |
| 2010/0162069 A1 | 6/2010 | Niu et al. | |
| 2010/0166119 A1 | 7/2010 | Wang et al. | |
| 2010/0169400 A1 | 7/2010 | Yang et al. | |
| 2010/0172291 A1 | 7/2010 | Kim et al. | |
| 2010/0172318 A1 | 7/2010 | Zhu et al. | |
| 2010/0173631 A1 | 7/2010 | Kim et al. | |
| 2010/0203917 A1 | 8/2010 | Yang et al. | |
| 2010/0208831 A1 | 8/2010 | Zhu et al. | |
| 2010/0226311 A1 | 9/2010 | Yang et al. | |
| 2010/0227565 A1 | 9/2010 | Sun et al. | |
| 2010/0227618 A1 | 9/2010 | Yang et al. | |
| 2010/0234059 A1 | 9/2010 | Yang et al. | |
| 2010/0254472 A1 | 10/2010 | Wang et al. | |
| 2010/0272033 A1 | 10/2010 | Fwu et al. | |
| 2010/0272047 A1 | 10/2010 | Zhu et al. | |
| 2010/0273435 A1 | 10/2010 | Sun et al. | |
| 2010/0275081 A1 | 10/2010 | Zhang et al. | |
| 2010/0275085 A1 | 10/2010 | Venkatachalam et al. | |
| 2010/0279717 A1 | 11/2010 | Venkatachalam et al. | |
| 2010/0287452 A1 | 11/2010 | Xu et al. | |
| 2010/0329316 A1 | 12/2010 | Sun et al. | |
| 2010/0331000 A1 | 12/2010 | Zhu et al. | |
| 2011/0002279 A1 | 1/2011 | Yang et al. | |
| 2011/0003591 A1 | 1/2011 | Venkatachalam et al. | |
| 2011/0004760 A1 | 1/2011 | Sharaga et al. | |
| 2011/0004796 A1 | 1/2011 | Hsuan et al. | |
| 2011/0004804 A1 | 1/2011 | Xu et al. | |
| 2011/0029833 A1 | 2/2011 | Zhang et al. | |
| 2011/0038271 A1* | 2/2011 | Shin et al. | 370/252 |
| 2011/0044265 A1 | 2/2011 | Wang et al. | |

OTHER PUBLICATIONS

Zhu, et al., "Determining Hybrid Automatic Repeat Request (HARQ) Timing", U.S. Appl. No. 12/630,666, filed Dec. 3, 2009, pp. 1-31.

Li, et al., "Method and Device for Implicit Relay", U.S. Appl. No. 12/781,472, filed May 17, 2010, pp. 1-22.

Venkatachalam, et al., "Legacy and Advanced Access Service Network Internetworking", U.S. Appl. No. 12/889,285, filed Sep. 23, 2010, pp. 1-25.

Jain, et al., "Single Radio Wimax Interworking", U.S. Appl. No. 12/862,512, filed Aug. 24, 2010, pp. 1-37.

Venkatachalam, et al., "Enhancing Fragmentation and Defragmentation Procedures in Broadband Wireless Networks", U.S. Appl. No. 12/889,346, filed Sep. 23, 2010, pp. 1-28.

Zhu, et al., "Techniques for Formatting Signals for Transmission Using a Wireless Network", U.S. Appl. No. 12/962,045, filed Dec. 7, 2010, pp. 1-30.

Yang, et al., "Base Station Selection Method for Heterogeneous Overlay Networks", U.S. Appl. No. 12/977,797, filed Dec. 23, 2010, pp. 1-30.

Sharaga, et al., "Neighbor List Broadcasting Techniques", U.S. Appl. No. 12/914,097, filed Oct. 28, 2010, pp. 1-29.

Venkatachalam, et al., "Management of Ids for Closed Subscriber Group (Csg) Base Stations", U.S. Appl. No. 12/882,924, filed Sep. 15, 2010.

Yang, et al., "Techniques to Assign Multiple Identifiers in a Wireless Network", U.S. Appl. No. 12/851,841, filed Aug. 6, 2010, pp. 1-29.

Yang, et al., "Improved Radio-Link Reliability Using Multi-Carrier Capability in Wireless Broadband Systems", U.S. Appl. No. 12/822,643, filed Jun. 24, 2010, pp. 1-30.

Yang, et al., "Security Update Procedure for Zone Switching in Mixed-Mode Wimax Network", U.S. Appl. No. 12/855,400, filed Aug. 12, 2010, pp. 1-35.

Venkatachalam, et al., "Apparatus and Methods for Upgrading an Airlink in a Wireless Sysytem", U.S. Appl. No. 12/890,179, filed Sep. 24, 2010, pp. 1-25.

Yang, et al., "Relay Data Path Architecture for a Wireless Network", U.S. Appl. No. 12/872,808, filed Aug. 31, 2010, pp. 1-27.

Zhu, et al., "Physical Uplink Control Channel Interference Mitigation in Heterogenous Networks", U.S. Appl. No. 12/930,001, filed Dec. 23, 2010, pp. 1-33.

Yang, et al., "Techniques to Assign Identifiers in a Wireless Network", U.S. Appl. No. 12/851,756, filed Aug. 6, 2010, pp. 1-19.

Venkatachalam, et al., "Coverage Loss Recovery in a Wireless Communication Network", U.S. Appl. No. 12/826,639, filed Jun. 29, 2010, pp. 1-38.

Yang, et al., "Coordinating Broadcast Operations in a Mobile Wireless Network With Overlaid Cells", U.S. Appl. No. 12/633,853, filed Dec. 9, 2009, pp. 1-26.

Venkatachalam, et al., "Uplink Contention Based Access With Quick Access Channel", U.S. Appl. No. 12/890,819, filed Sep. 27, 2010, pp. 1-22.

Zhu, et al., "Configurable Common Reference Signal Port for Reference Signal Received Power in Distributed Antenna Systems", U.S. Appl. No. 12/928,758, filed Dec. 17, 2010, pp. 1-16.

Venkatachalam, et al., "Distributed Control Architecture for Relays in Broadband Wireless Networks", U.S. Appl. No. 12/889,938, filed Sep. 24, 2010, pp. 1-33.

Venkatachalam, et al., "System, Method and Apparatus for an Efficient Information Broadcast in a Multi-Carrier Wireless Network", U.S. Appl. No. 12/789,098, filed May 27, 2010, pp. 1-38.

Venkatachalam, et al., "Cell Reselection Mechanism for a Base Station With closed Subscriber Group", U.S. Appl. No. 12/886,764, filed Sep. 21, 2010, pp. 1-27.

Yang, Rongzhen "Techniques to Control Uplink Power", U.S. Appl. No. 12/782,800, filed May 19, 2010, pp. 1-20.

Yang, et al., "Channel Quality Indexing and Reverse Indexing", U.S. Appl. No. 12/646,745, filed Dec. 23, 2009, pp. 1-19.

Yang, et al., "Techniques to Control Uplink Power ", U.S. Appl. No. 12/590,546, filed Nov. 10, 2009, pp. 1-39.

Yang, et al., "Downlink and Uplink Pathloss Estimation Gap Adjustment Scheme for Wireless Systems", U.S. Appl. No. 12/969,819, filed Dec. 16, 2010, pp. 1-28.

Yang, et al., "Methods for an Uplink Power Control Mechanism", U.S. Appl. No. 12/903,009, filed Oct. 12, 2010, pp. 1-29.

Yang, et al., "Uplink Power Control in Wireless Networks", U.S. Appl. No. 12/843,940, filed Jul. 27, 2010, pp. 1-26.

Yang, et al., "An Uplink Power Control Scheme", U.S. Appl. No. 12/630,673, filed Dec. 3, 2009, pp. 1-35.

Hsuan, et al., "Techniques to Reduce False Detection of Control Channel Messages in a Wireless Network", U.S. Appl. No. 12/889,949, filed Sep. 24, 2010, pp. 1-37.

\* cited by examiner

UPLINK POWER HEADROOM CALCULATION AND REPORTING FOR OFDMA CARRIER AGGREGATION COMMUNICATION SYSTEM

CROSS-REFERENCE TO RELATED APPLICATIONS

This application claims priority under 35 U.S.C. 119(e) to U.S. Provisional Patent Application No. 61/356,538, filed on Jun. 18, 2010.

TECHNICAL FIELD

This application relates to power headroom calculation and, more particularly, to obtaining a particular parameter used in power headroom calculation under the latest long-term evolution standard.

BACKGROUND

LTE, or long-term evolution, is a fourth generation (4G) high-performance air interface standard for wireless mobile communications. Carrier aggregation (CA) is a feature of the latest release of the LTE standard, in which user equipment (UE) is able to concurrently utilize radio resources from multiple carrier frequencies.

Uplink physical channels such as the PUSCH (physical uplink shared channel) and PUCCH (physical uplink control channel) are used to transmit information originating in layers above the PHY layer.

In the LTE release draft 10, the power headroom report (PHR) for carrier aggregation (CA) does not define how the user equipment chooses a key parameter, $M_{PUSCH}$, when the PHR may be transmitted on any uplink component carrier (CC). The parameter, $M_{PUSCH}(i)$, is the bandwidth of the PUSCH resource assignment, expressed in number of resource blocks, valid for subframe, i.

Under carrier aggregation, due to scheduling flexibility, the PUSCH used for data transport may utilize any combination of resources from different carriers. (3$^{rd}$ Generation Partnership Project, Technical Specification Group Radio Access Network; Evolved Universal Terrestrial Access (E-UTRA); Physical Layer procedures (Release 9), Version 9.1.0, March 2010, hereinafter, "3GPP specification").

Thus, there is a need to define the parameter, $M_{PUSCH}$, for the latest LTE standard.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a carrier aggregation power headroom reporting method is disclosed. The method provides all solutions to a single parameter used to calculate the power headroom where carrier aggregation is used in an LTE air interface environment. The method may be applied to next generation OFDMA-based wireless broadband technologies and related products, such as 3GPP LTE-Advanced systems, to support seamless uplink power control and resource scheduling in a robust way.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 1:
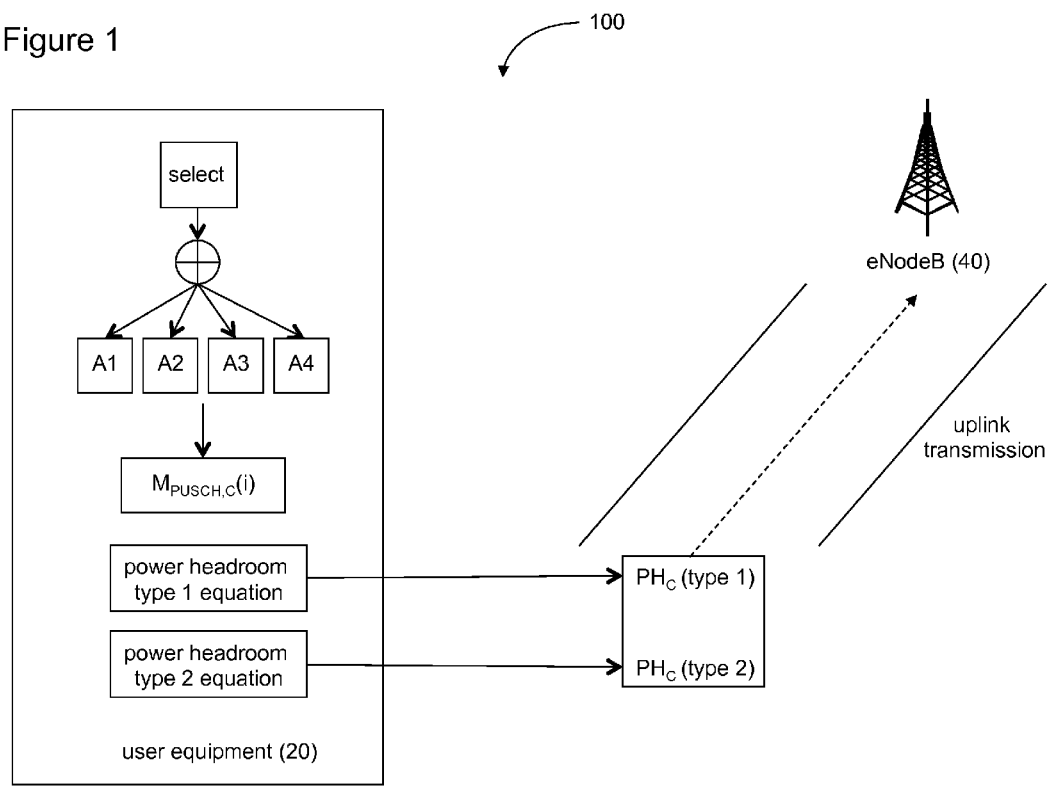
FIG. 1 is a schematic block diagram of a carrier aggregation power headroom reporting method, according to some embodiments.

FIG. 1 is a block diagram of a carrier aggregation power headroom reporting method 100, according to some embodiments. User equipment 20 selects from one of four alternative definitions of a single parameter used to calculate the power headroom of the user equipment. The user equipment uses the parameter to calculate the power headroom for two different equations. The two results, $PH_C$(type 1) and $PH_C$(type 2), are transmitted to the enhanced base station 40. The carrier aggregation power headroom reporting method 100 includes solutions that may be used to calculate the PHR value for LTE advanced carrier aggregation, which may be a part of LTE release 10.

The following terms are used herein to describe operation of the carrier aggregation power headroom reporting method 100. Power headroom is defined as the difference between the maximum transmit power and the estimated power of the user equipment for PUSCH transmission in the current sub-frame. As shown below, there are two different equations used by the carrier aggregation power headroom reporting method 100 for calculating power headroom of the user equipment. The terms 3GPP and LTE are used interchangeably herein to denote the enhanced air interface standard described in the 3GPP specification. User equipment (UE) 20 describes the devices, such as cellular phones and laptop computers, that will establish a connection to a cellular network under 3GPP. The enhanced base station supporting 3GPP is known as eNodeB 40.

In the 3GPP specification, the following equation is used for calculating the power headroom:

$$PH(i) = P_{CMAX} - \{10 \log 10(M_{PUSCH}(i)) + P_{O\_PUSCH}(j) + \alpha(j) \cdot PL + \Delta_{TF}(i) + f(i)\} \quad (1)$$

The equation is expressed in decibels (dB), where:

$P_{CMAX}$ is the configured UE transmitted power $M_{PUSCH}(i)$ is the bandwidth of the PUSCH resource assignment expressed in number of resource blocks valid for sub-frame i $P_{O\_PUSCH}(j)$ is a parameter composed of the sum of a cell-specific nominal component, $P_{O\_NOMINAL\_PUSCH}(j)$, provided from higher layers for j=0 and 1 and a UE-specific component, $P_{O\_UE\_PUSCH}(j)$ provided by higher layers for j=0 and 1.

For j=0 or 1, $\alpha \in \{0, 0.4, 0.5, 0.6, 0.7, 0.8, 0.9, 1\}$ is a 3-bit cell-specific parameter provided by higher layers. For j=2, $\alpha(j)=1$.

PL is the downlink path loss estimate calculated in the UE, in dB $\Delta_{TF}(i) = 10 \log_{10}((2^{MPR \cdot K_S} - 1)\beta_{offset}^{PUSCH})$ for $K_S = 1.25$ and 0 for $K_S = 1.25$ where $K_S$ is given by the UE-specific parameter, deltaMCS-Enabled, provided by higher layers $f(i) = \delta_{PUSCH}(i - K_{PUSCH})$ if accumulation is not enabled based on the UE-specific parameter, Accumulation-enabled, provided by higher layers, where $\delta_{PUSCH}$ is a UE-specific correction value, as further defined in the 3GPP specification For further information on this formula and its parameters, refer to the 3GPP specification. The carrier aggregation power headroom reporting method 100 pertains to the $M_{PUSCH}$ parameter only.

Carrier aggregation (CA) is supported in the 3GPP specification. Carrier aggregation enables multiple LTE component carriers (CCs) to be aggregated, or grouped together, on the physical layer to provide the desired bandwidth for transmission. Thus, two component carriers of 20 MHz each would supply a 40 MHz bandwidth for transmission.

To include power headroom reporting (PHR) in carrier aggregation, the carrier aggregation power headroom reporting method 100 makes the following three assumptions:
1. The user equipment 20 reports all active component carriers (CCs) power headroom to eNodeB 40.
2. $P_{CMAX}$ in equation (1) is replaced by $P_{CMAX,C}$, where $P_{CMAX,C}$ defines the maximum transmission power of each component carrier, C.
3. Two types of power headroom are to be reported from the user equipment 20 to eNodeB 40:
   a. type 1: $P_{CMAX,C}$ minus PUSCH power
   b. type 2: $P_{CMAX,C}$ minus PUCCH power minus PUSCH power The power headroom equations for type 1 and type 2 power headroom reporting are adapted from equation (1), using the new notation denoting the component carrier, C. Type 1 power headroom calculation, $P_{CMAX,C}$ minus PUSCH power, is given by:

$$PH_C(\text{Type1}) = P_{CMAX,C} - \{10 \log 10(M_{PUSCH,C}(i)) + P_{O\_PUSCH,C}(j) + \alpha_C(j) \cdot PL_C + \Delta_{TF,C}(i) + f_C(i)\} \quad (2)$$

The equation is expressed in decibels (dB).

Type 2 power headroom calculation, $P_{CMAX,C}$ minus PUCCH power minus PUSCH power, is given by:

$$PH_C(Type2) = P_{CMAX,C} - \{10\log 10(M_{PUSCH,C}(i)) + \quad (3)$$
$$P_{O\_PUSCH,C}(j) + \alpha_C(j) \cdot PL_C + \Delta_{TF,C}(i) + f_C(i)\} -$$
$$\{P_{0\_PUCCH,C} + PL + h_C(n_{CQI}, n_{HARQ}) + \Delta_{F\_PUCCH,C}(F) + g_C(i)\}$$

As with equations (1) and (2), equation (3) is expressed in decibels, and $P_{O\_PUCCH}$ is a parameter composed of the sum of a cell specific parameter $P_{O\_NOMINAL\_PUSCH}(i)$ provided by higher layers and a UE-specific component $P_{O\_UE\_PUSCH}(j)$ provided by higher layers $h(n_{CQI}, n_{HARQ})$ is a PUCCH format dependent value, where $n_{CQI}$ corresponds to the number of information bits for the channel quality information and $n_{HARQ}$ is the number of hybrid automatic repeat request (HARQ) bits $\Delta_{F\_PUCCH}(F)$ is provided by higher layers. Each $\Delta_{F\_PUCCH}(F)$ value corresponds to a PUCCH format (F) relative to PUCCH format 1a, where each PUCCH format (F)

$$g(i) = g(i-1) + \sum_{m=0}^{M-1} \delta_{PUCCH}(i - k_m)$$

where g(i) is the current PUCCH power control adjustment state and where g(0) is the first value after reset.

These parameters are beyond the scope of the carrier aggregation power headroom reporting method 100. For further information on the parameters, refer to the 3GPP specification.

The power headroom, $PH_C$, may be transmitted on any uplink component carrier. Alternatively, the power headroom may be transmitted only on the component carrier for which the PHR is being made. The carrier aggregation power headroom reporting method 100 assumes that the PHR may be transmitted on any uplink component carrier. Since, under this assumption, the PHR of one component carrier may be transmitted on another uplink component carrier, it becomes challenging to determine the value of $M_{PUSCH,C}(i)$.

The parameter, $M_{PUSCH,C}(i)$, is defined above as, "the bandwidth of the PUSCH resource assignment expressed in number of resource blocks valid for sub-frame i". If the power headroom is reported only on the component carrier for which the PHR is reporting (as in the single-carrier, non-carrier-aggregation case), there is no issue because the uplink bandwidth is known and identified for this component carrier. But, if the PHR of one component carrier can be carried on another component carrier, there are several outcomes that render the $M_{PUSCH,C}(i)$ parameter ambiguous.

Figure 2:
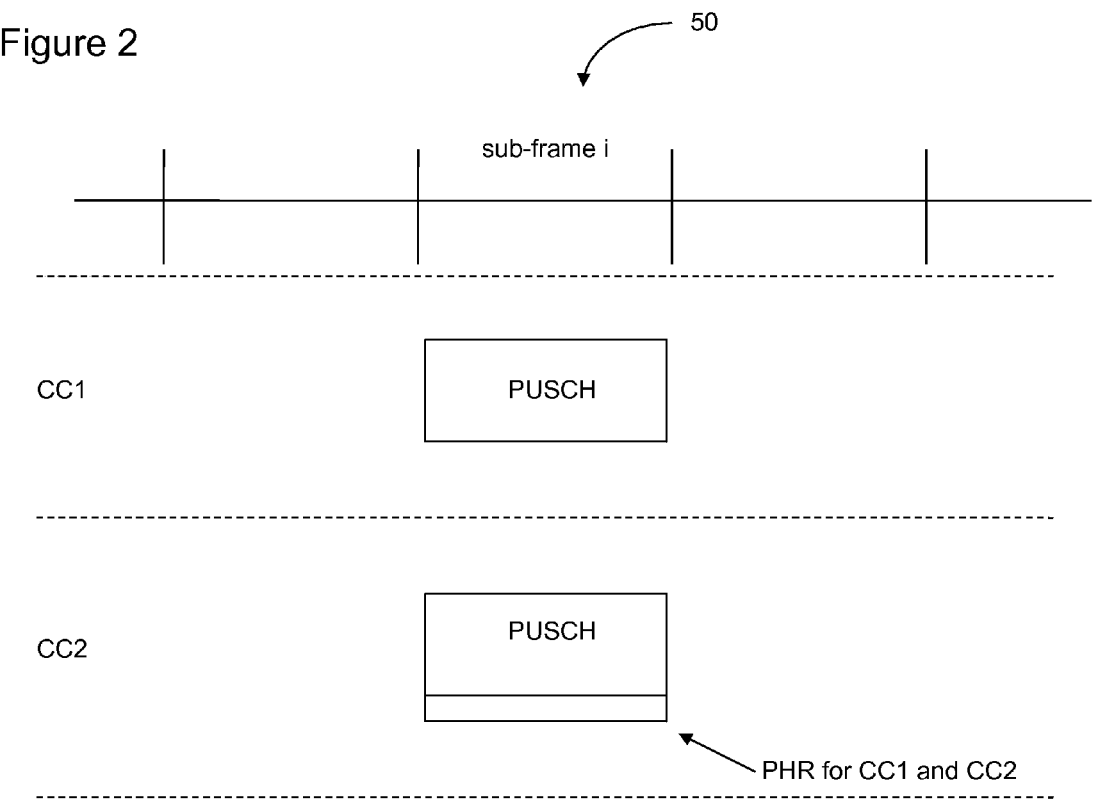
FIG. 2 is a diagram showing simultaneous PUSCH in two component carriers, according to some embodiments.

Using two active uplink component carriers, the following two examples underscore this ambiguity. In a first case, denoted case 1, two component carriers have the PUSCH at sub-frame i, but the power headroom reporting for both component carriers are transmitted on a single component carrier, as shown in FIG. 2. FIG. 2 shows simultaneous PUSCH in two component carriers. The PUSCH for component carrier CC1 is in sub-carrier i, and the PUSCH for component carrier CC2 is also in sub-carrier i. In this example, the power headroom reporting for both component carriers is transmitted in the PUSCH of the second component carrier, CC2.

The issue of transmitting the PHR on the second component carrier, CC2, for the first component carrier, CC1, is that it is unclear whether the value of $M_{PUSCH,C}(i)$ denotes bandwidth information for the first component carrier, CC1 or the second component carrier, CC2. There are three possible interpretations for the example depicted in FIG. 2:
Alternative 1: $M_{PUSCH,C}(i)$ is set as the PUSCH bandwidth of the PHR-carrying component carrier (CC2 in the example of FIG. 2)
Alternative 2: $M_{PUSCH,C}(i)$ is set as the PUSCH bandwidth of the PHR-related component carrier (CC1 in the example). In this context, "related" means that the PHR is used to carry the information of this component carrier
Alternative 3: $M_{PUSCH,C}(i)$ is set as the total PUSCH bandwidth of user equipment in sub-frame i (CC1 plus CC2 in the example)

Figure 3:
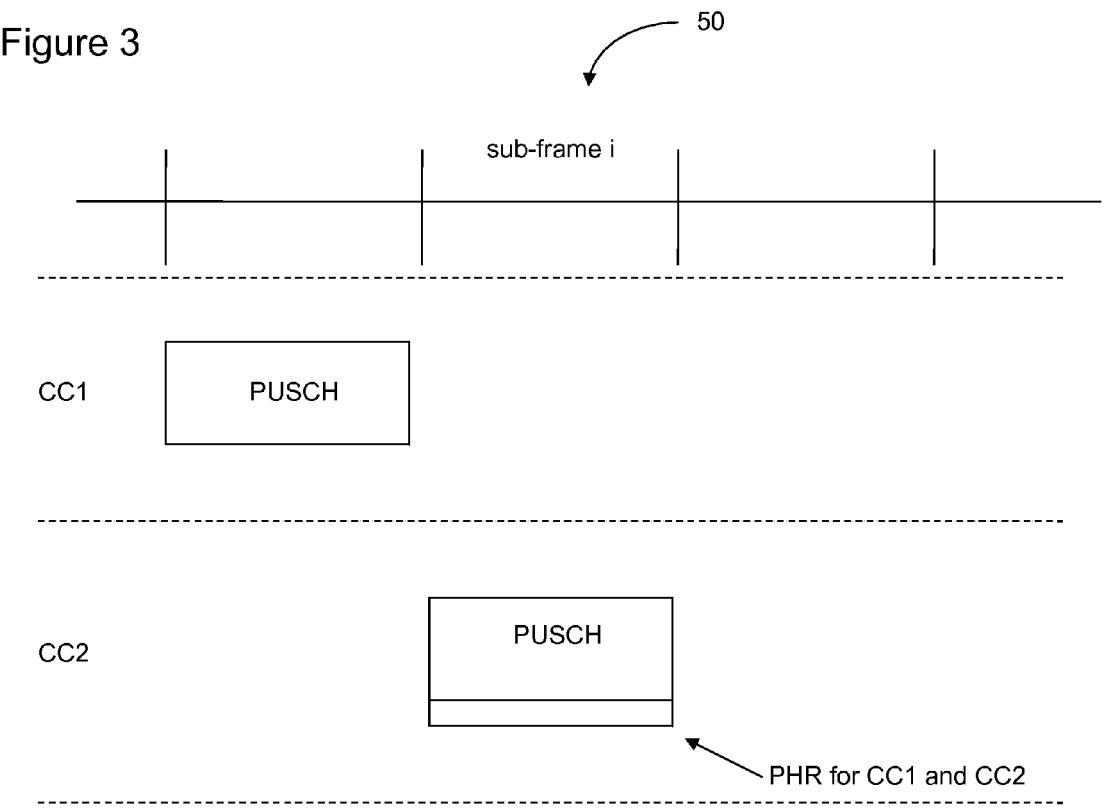
FIG. 3 is a diagram showing non-simultaneous PUSCH in two component carriers, according to some embodiments.

In a second case, denoted case 2, only one component carrier has the PUSCH at sub-frame i, with the other component carrier having the PUSCH at an adjacent sub-frame. FIG. 3 depicts case 2, with adjacent, rather than simultaneous, PUSCHs for two component carriers. In FIG. 3, the PUSCH for component carrier, CC1, is in sub-frame i−1, while the PUSCH for component carrier, CC2, is in sub-frame i. As before, the power headroom reporting for both component carriers is in the PUSCH for the second component carrier, CC2.

Just as with case 1, in the calculation of the power headroom reporting for the first component carrier, CC1, the value of the parameter $M_{PUSCH,C}(i)$ is not clearly defined. It is at least clear that the value of $M_{PUSCH,C}(i)$ cannot be set as the bandwidth of the first component carrier, CC1, in sub-frame i, because the bandwidth is zero. Where $M_{PUSCH,C}(i)$ is zero, calculating the power headroom value using either equation (2) or (3) would be meaningless.

For case 2, there are four alternatives for $M_{PUSCH,C}(i)$ in the first component carrier PHR calculation:

Alternative 1: $M_{PUSCH,C}(i)$ is set as the PUSCH bandwidth of the PHR-carrying component carrier (CC2 in the example of FIG. 3)

Alternative 2: $M_{PUSCH,C}(i)$ is set as the latest PUSCH bandwidth of the PHR-related component carrier (the $(i-1)^{st}$ sub-frame of CC1 in the example)

Alternative 3: $M_{PUSCH,C}(i)$ is set as a predefined value (such as one or a maximum resource block (RB) value of the component carrier). The pre-defined value may be either eNodeB-specific or UE-specific, based on the radio resource control (RRC) configuration Alternative 4: $M_{PUSCH,C}(i)$ is set as the total PUSCH bandwidth of user equipment in sub-frame i (CC1 plus CC2 in the example)

Summarizing cases 1 and 2, when one component carrier's PHR is reported by another component carrier, there are up to four alternative interpretations of what the $M_{PUSCH,C}(i)$ parameter means:

Alternative 1: $M_{PUSCH,C}(i)$ is set as the total PUSCH bandwidth of the PHR-carrying component carrier Alternative 2: $M_{PUSCH,C}(i)$ is set as the latest (including current sub-frame) PUSCH bandwidth of the PHR-related component carrier Alternative 3: $M_{PUSCH,C}(i)$ is set as a predefined value (such as one or a maximum resource block (RB) value of the PHR-related component carrier). The pre-defined value may be either eNodeB-specific or UE-specific, based on the radio resource control (RRC) configuration Alternative 4: $M_{PUSCH,C}(i)$ is set as the total PUSCH bandwidth of user equipment in sub-frame i Returning to FIG. 1, the user equipment 20 will select from one of the four alternatives for defining the $M_{PUSCH,C}(i)$ parameter. Once the $M_{PUSCH,C}(i)$ parameter is known, the power headroom is calculated using equations (2) (for type 1 power headroom) and (3) (for type 2 power headroom), as described above.

One of the above alternatives is likely to be selected by the LTE advanced standard in the future to eliminate the confusion with the explicit description. In the carrier aggregation power headroom reporting method 100, all four of the alternatives are available to the user equipment 20 to ensure coverage, whatever future decisions about the LTE standard are made.

Figure 4:
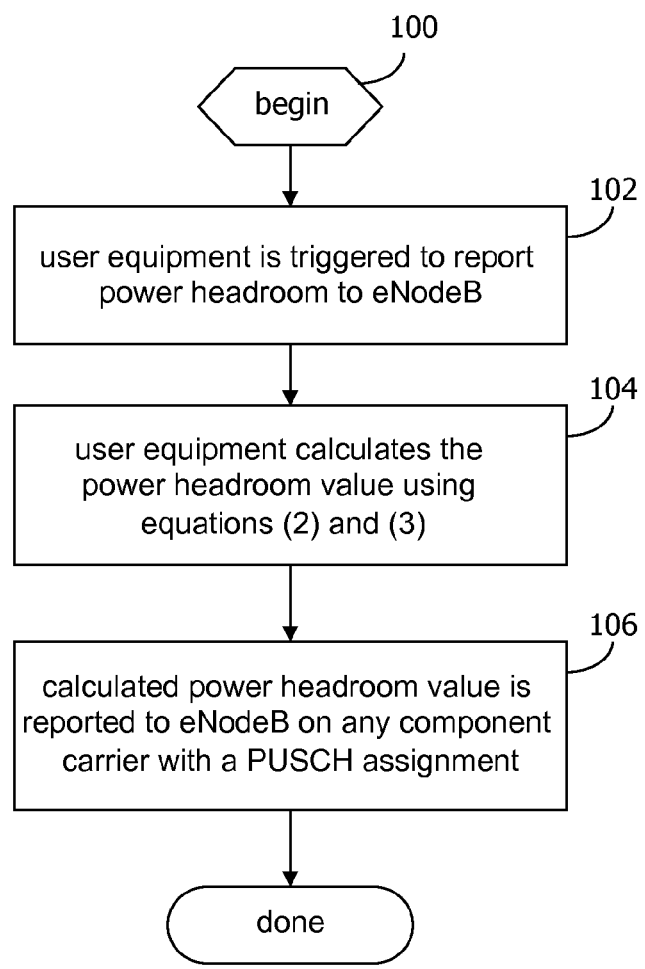
FIG. 4 is a flow diagram of the carrier aggregation power headroom reporting method, according to some embodiments.

FIG. 4 is a flow diagram depicting operation of the carrier aggregation power headroom reporting method 100, according to some embodiments. During communication, the mobile station (user equipment 20) is triggered to report the power headroom (PHR) to the eNodeB 40, as defined in the 3GPP specification (block 102). The PHR value is calculated using equations (2) and (3) separately (block 104). Recall from the three assumptions described above that both type 1 PHR and type 2 PHR are calculated by the user equipment 20 and transmitted uplink to the eNodeB 40.

For either equation, the $M_{PUSCH,C}(i)$ value is obtained using one of the four alternatives described above. Following the calculation by the user equipment, the power headroom value is quantized and reported to the eNodeB on any component carrier with a PUSCH assignment (block 106). The quantizing and reporting are defined in the 3GPP specification and are beyond the scope of this document.

The carrier aggregation power headroom reporting method 100 thus presents all solutions for determining the $M_{PUSCH}(i)$ parameter value, which may then be used in the PHR calculation for carrier aggregation in an LTE system. The carrier aggregation power headroom reporting method 100 may be applied to next generation OFDMA-based wireless broadband technologies and related products, such as 3GPP LTE-Advanced systems, to support seamless uplink power control and resource scheduling in a robust way.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method, comprising:
   selecting, by a user equipment operating in a long-term evolution (LTE) network in which carrier aggregation is to be performed, one of the following four definitions of a $M_{PUSCH}$ parameter, $M_{PUSCH}(i)$, wherein $M_{PUSCH}(i)$ is a bandwidth of a physical uplink shared channel transmission (PUSCH) resource assignment expressed in number of resource blocks valid for sub-frame, i, and a first component carrier's (CC1) power headroom (PHR) is to be reported by a second component carrier (CC2):
   $M_{PUSCH}(i)$ is a total PUSCH bandwidth of CC1;
   $M_{PUSCH}(i)$ is a latest PUSCH bandwidth, including current sub-frame, of CC2;
   $M_{PUSCH}(i)$ is set as a predefined value; and
   $M_{PUSCH}(i)$ is set as the PUSCH bandwidth of CC1 summed with the PUSCH bandwidth of CC2;
   calculating, by the user equipment, a first PHR value, $PH_C$ (Type1) using one of the four definitions of $M_{PUSCH}(i)$;
   calculating, by the user equipment, a second PHR value, $PH_C$(Type2) using one of the four definitions of $M_{PUSCH}(i)$; and
   transmitting, by the user equipment, $PH_C$(Type1) and $PH_C$ (Type2), to an enhanced node (eNodeB).

2. The method of claim 1, further comprising:
   calculating the first PHR value, $PH_C$(Type1) using the following formula:

$$PH_C(\text{Type1}) = P_{CMAX,C} - \{10 \log 10(M_{PUSCH,C}(i)) + P_{O\_PUSCH,C}(j) + a_C(j) \cdot PL_C + \Delta_{TF,c}(i) + f_C(i)\}$$

wherein $P_{CMAX,C}$ defines the maximum transmission power of each component carrier, CC1 and CC2; $P_{O\_PUCCH}$ is a parameter composed of the sum of a cell specific parameter $P_{O\_NOMINAL\_PUSCH}(j)$ and a user-equipment-specific component $P_{O\_UE\_PUSCH}(j)$ provided by a higher layer; for j=0 or 1, a∈{0, 0.4, 0.5, 0.6, 0.7, 0.8, 0.9, 1} is a three-bit cell-specific parameter provided by the higher layer, for j=2, a(j)=1; PL is a downlink path loss estimate calculated in the user equipment, in deciBels; $\Delta_{TF}(i) = 10 \log_{10}((2^{MPR \cdot K_S} - 1) \beta_{offset}^{PUSCH})$ for $K_S$=1.25 and 0 for $K_S$=1.25, where $K_S$ is given by a user equipment-specific parameter provided by a higher layer; $f(i) = \delta_{PUSCH}(i - K_{PUSCH})$ if accumulation is not enabled based on a second user equipment-specific parameter, where $\delta_{PUSCH}$ is a user equipment-specific correction value.

3. The method of claim 2, further comprising:
calculating the second PHR value, $PH_C(\text{Type2})$ using the following formula:

$PH_C(\text{Type2}) = P_{CMAX,C} - \{10 \log 10(M_{PUSCH,C}(i) + P_{O\_PUSCH,C}(j) + a_C(j) \cdot PL_C + \Delta_{TF,C}(i) + f_C(i)\} - \{P_{O\_PUCCH,C} + PL + h_C(n_{CQI}, n_{HARQ}) + \Delta_{F\_PUCCH,C}(F) + g_C(i)\}$ wherein $P_{O\_PUSCH}(j)$ is a parameter composed of the sum of a cell-specific nominal component, $P_{O\_NOMINAL\_PUSCH}(j)$, provided from the higher layer for j=0 and 1 and a third user equipment-specific component, $P_{O\_UE\_PUCCH}(j)$, provided by the higher layer for j=0 and 1; $h(n_{CQI}, n_{HARQ})$ is a physical uplink control channel (PUCCH) format-dependent value, where $n_{CQI}$ corresponds to the number of information bits for a channel quality information and $n_{HARQ}$ is a number of hybrid automatic repeat request (HARQ) bits; $\Delta_{F\_PUCCH}(F)$ is provided by the higher layer; and $$g(i) = g(i-1) + \sum_{m=0}^{M-1} \delta_{PUCCH}(i - k_m)$$

where g(i) is a current PUCCH power control adjustment state and where g(0) is a first value after reset.

4. The method of claim 1,
wherein the predefined value is specific to the eNodeB.

5. The method of claim 1,
wherein the predefined value is not specific to the eNodeB.

* * * * *

UNITED STATES PATENT AND TRADEMARK OFFICE
CERTIFICATE OF CORRECTION

PATENT NO.        : 8,594,718 B2  
APPLICATION NO.   : 12/889318  
DATED             : November 26, 2013  
INVENTOR(S)       : Rongzhen Yang et al.

Page 1 of 1

It is certified that error appears in the above-identified patent and that said Letters Patent is hereby corrected as shown below:

In the Claims

In column 6, line 53, in claim 2, delete "$+a_C(j)$" and insert -- $+\alpha_C(j)$ --, therefor.

In column 6, line 60, in claim 2, delete "a$\epsilon$" and insert -- $\alpha \in$ --, therefor.

In column 6, line 62, in claim 2, delete "a" and insert -- $\alpha$ --, therefor.

In column 6, line 64, in claim 2, delete "$2^{MPR-K}{}_s$" and insert -- $2^{MPR.Ks}$. --, therefor.

In column 7, line 7, in Claim 3, delete "$(M_{PUSCH,c}(i) + P_{O\_PUSCH,c}(j) + a_C(j)$" and insert -- $(M_{PUSCH,c}(i)) + P_{O\_PUSCH,c}(j) + \alpha_C(j)$ --, therefor.

In column 7, line 14, in Claim 3, delete "$P_{O\_UE\_PUCCH}(J)$" and insert -- $P_{O\_UE\_PUSCH}(J)$ --, therefor.

Signed and Sealed this  
Seventeenth Day of June, 2014

Michelle K. Lee  
*Deputy Director of the United States Patent and Trademark Office*